Patented Nov. 5, 1946

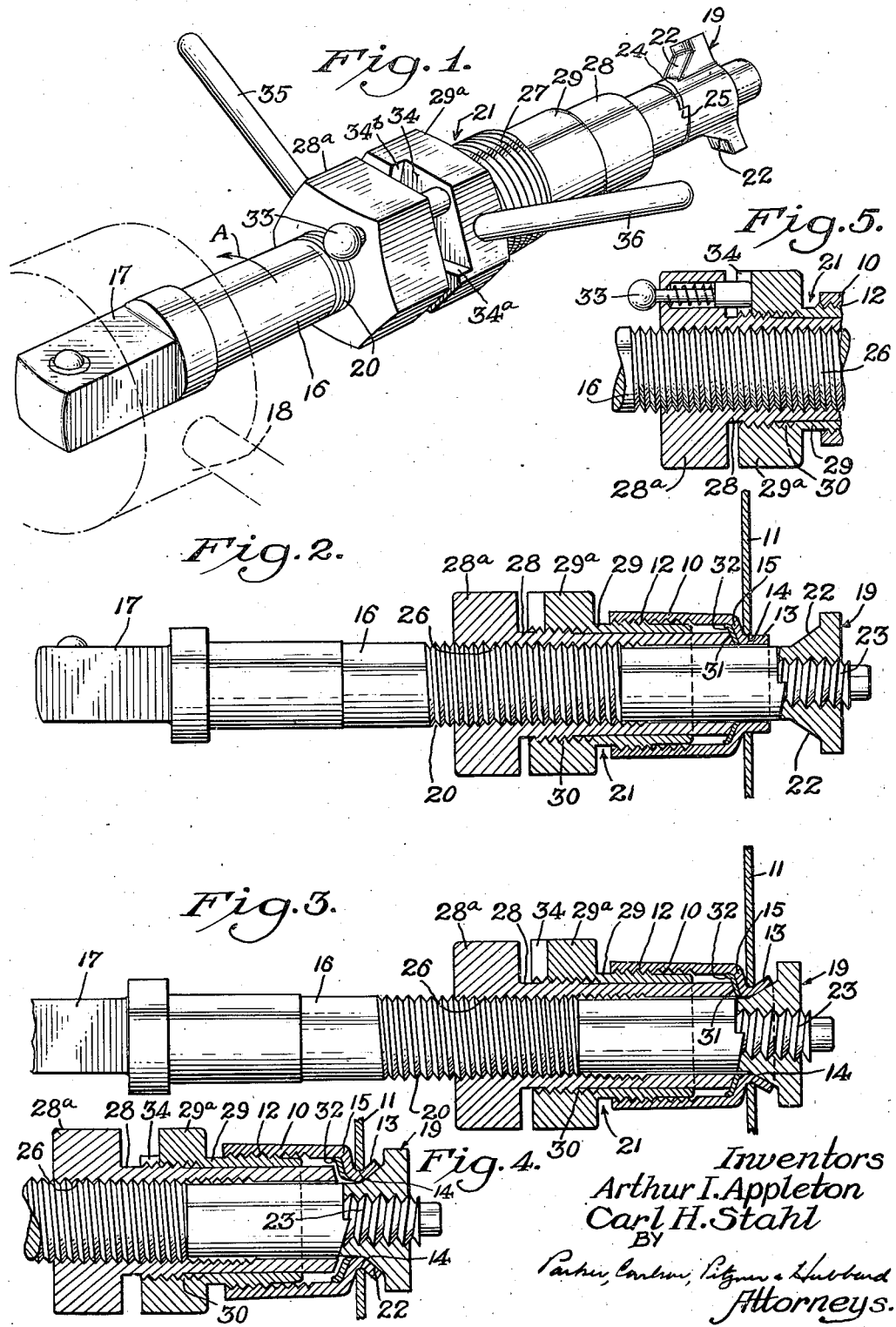

2,410,476

UNITED STATES PATENT OFFICE 2,410,476

SPINNING TOOL

Arthur I. Appleton, Northbrook, and Carl H. Stahl, Villa Park, Ill., assignors to Appleton Electric Company, Chicago, Ill., a corporation of Illinois Application October 8, 1943, Serial No. 505,484

6 Claims. (Cl. 218—19)

The present invention pertains to a novel tool for spinning or flaring an end portion of such a device as a fitting or the like in attaching the same to a box or wall.

The general aim of the present invention is to provide a novel tool of the type indicated which is characterized especially by its simplicity and ruggedness of construction, as well as by its adaptability to use in locations difficult of access.

More particularly, it is an object to provide such a tool in which a spinner head is adapted to be revolved and coincidentally drawn into the throat of a fitting or the like to spin or flare the latter progressively outward to a desired contour.

Another object is to provide such a tool in which the spinner head is removably screwed on its drive spindle so that the head may be removed for insertion of the spindle into the work, but in which the arrangement is such that the head will actually tend to be tightened on the spindle rather than loosened as an incident to operation of the tool.

Still another and important object is to provide such a tool in which provision is made for not only threading the tool into an internally threaded fitting or the like which is to be operated upon so as to hold the tool in place during operation, but in which provision is also made for quickly and easily freeing the tool from the fitting no matter how great the tendency of the rotation of the tool incident to operaion may be to jam it tightly into the threaded fitting. As will hereinafter appear in greater detail, this object is accomplished through the use of a novel supporting arrangement embodied in the tool and which is longitudinally contractible to free any jamming of the support within the fitting which may be occasioned by operation of the tool.

Further objects and advantages of the invention will become apparent as the following description proceeds, taken in connection with the accompanying drawing in which:

Figure 1 is a perspective view of a spinning tool embodying the invention.

Figs. 2 and 3 are side elevations, partially in longitudinal section, of the tool of Fig. 1 and illustrating successive positions thereof in the course of its operation.

Fig. 4 is a fragmentary longitudinal sectional view illustrating the contraction of the supporting structure of the tool in freeing it from the work.

Fig. 5 is a fragmentary detail view showing the central portion of the tool in longitudinal section.

While the invention is susceptible of various modifications and alternative constructions, we have shown in the drawing and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

Referring more particularly to the drawing, an exemplary embodiment of the tool has been shown in Fig. 1. In Figs. 2 and 3 this tool is illustrated as used for spinning or flaring the reduced end portion of a fitting 10 in attaching the latter to a wall 11. The particular fitting or nipple shown is one such as is commonly used in attaching electrical conduits to outlet boxes in various wiring installations. It is internally threaded at 12 in order to receive a threaded conduit (not shown) which will later be attached, and has a reduced end portion 13 which is inserted through a hole 14 in the box wall 11. This reduced end portion 13 is flared or spun by the herein disclosed tool to the contour indicated in Fig. 3 to secure the fitting 10 to the wall 11. In so attaching the fitting, the tool not only flares out the lip or edge of the portion 13 to a generally frusto-conical shape, but also expands the throat of the fitting at the point where it passes through the wall 11 and squeezes the shoulder 15 of the fitting against the outer face of the wall. In this way the fitting is rigidly attached to the wall 11 with a permanent water-tight joint.

The more or less detailed reference to the fitting 10 made herein is simply for the purpose of clarifying the action of the tool and the purposes of various features embodied in the tool. No inference is to be drawn, accordingly, that the tool is in any way limited to use with this particular form of fitting. On the contrary, it is equally well suited for use in effecting the spinning attachment of a great variety of other articles. In fact, one of the prime virtues of the tool shown is the facility with which it may be adapted for insertion into articles of different internal diameters and shapes.

Turning now to the tool itself (Fig. 1), in the exemplary construction illustrated it comprises a spindle 16 having a squared outer end 17 to which may be applied any suitable handle for turning the same, such, for example, as a conventional ratchet handle indicated in phantom at 18. On the opposite or forward end of the spindle 16 is removably fixed a spinner head 19, while the intermediate portion of the spindle is threaded at 20 for reception of the same within a supporting structure designated generally as 21 and which is itself adapted to be screwed into the fitting 10. In brief, the arrangement is such that when the supporting structure 21 is in position within the fitting 10, rotation of the spindle 16 will cause it not only to turn the spinner head 19 but also to draw the same into the reduced forward end of the fitting (from the position of Fig. 2 to that of Fig. 3), thus distorting the fitting in the proper manner for its rigid attachment to the wall 11. The threads 20 effect the axial feed of the spindle in coordination with its turning.

The spinner head 19 is illustrated as being of T-shape, and disposed with the arms of the T projecting laterally, the stem of the T extending coaxially with the spindle 16 and toward the central portion of the latter. Hardened active surfaces 22 are provided on the undersides of the T arms and are tapered or sloped inward toward the spindle axis. The surfaces 22 conform substantially to the contour which it is desired to impart by spinning to the reduced end portion 13 of the fitting (see Fig. 3). Moreover, the spinner head is of sufficiently great width adjacent the inner ends of the active surfaces 22 that the throat portion of the reduced end 13 on the fitting will be expanded into tight engagement with the edges of the hole 14 as the spinning head is pulled axially into this throat.

Although removability of the spinner head 19 is requisite for initial insertion of the tool if the head is to be shaped to be drawn axially into the end of the work as shown, any such removable mounting of the head poses a problem because of the heavy frictional drag imposed by the work in the course of operation. In the present instance the spinner head 19 is screwed on the reduced forward end of the spindle 16, threads 23 being provided on the latter for that purpose. To prevent the spinner head from being inadvertently unscrewed from the spindle during operation, the threads 23 are cut with a lead which is reversed with respect to that of the feed threads 20 on the intermediate portion of the spindle. In the present instance the feed threads 20 are righthand and the spinner head securing threads 23 are lefthand. With such an arrangement, turning of the spindle 16 leftward (in the direction of the arrow A in Fig. 1) withdraws it through the supporting structure 21, pulling the spinner head into the work, and at the same time the frictional drag on the spinner head imposed by the work tends to screw the spinner head ever more tightly into place on the spindle.

Provision is desirably made for preventing the spinner head 19 from becoming so tightly jammed on the spindle that its subsequent removal is difficult. For that purpose abutments in the form of mating teeth 24 and 25 (Fig. 1) are provided on the spindle and spinner head, respectively, so as to limit the screwing of the spinner head on to the spindle.

The supporting structure 21 is generally tubular in form, being threaded internally at 26 (Fig. 2) to receive the threads 20 on the spindle and threaded externally at 27 (Fig. 1) for screwing the same into the threads 12 in the fitting. In the present instance such supporting structure comprises inner and outer sleeve elements 28, 29 threaded together as indicated at 30 so that turning one sleeve element relative to the other changes the length of the supporting structure. Longitudinal contraction of the supporting structure is used in freeing it from the fitting, as will appear. The inner sleeve 28 is substantially longer than the outer sleeve 29 and projects beyond the latter at both ends. Integral hexagonal heads 28a and 29a, suitable for wrench engagement, are provided on respective sleeves at their outer ends. The projecting nose portion of the other end of the inner sleeve 28 is beveled as indicated at 31 for engagement with the shoulder 15 in the fitting. Normally a protective washer 32 is located within the fitting on the inner face of this shoulder and against which the nose 31 of the sleeve bears. Relative rotation of the sleeve elements 28, 29, and thus their relative axial movement, is limited by a spring-urged stop pin 33 carried by the head 28a and having its inner nose portion received in a slot 34 cut in the outer face of the other head 29a (Figs. 1 and 5).

In some instances engagement of the sleeve heads 28a, 29a by wrenches or a vise may be inexpedient because of the location of the fitting which is being operated upon. To take care of such contingency, hand levers or rods 35, 36 (Fig. 1) are removably threaded in suitable tapped holes provided in the respective sleeve heads 28a, 29a.

In using the tool to fix the illustrated fitting 10 to the wall 11, the spinner head 19 is removed from the spindle and the nose of the tool inserted into the loose fitting. The workman holds the fitting 10 in one hand and grasps the shank of the spindle 16 in the other, turning the spindle to the right (i. e., in a direction opposite to the arrow A) to screw the externally threaded sleeve 29 into the fitting. In so manipulating the device, the spindle 16 is threaded into the inner sleeve 28 as far as it will go and then the latter turns with respect to the outer sleeve until the pin 33 abuts against the end face 34a of the notch 34. Thereafter the outer sleeve 29 turns with the inner sleeve 28 and spindle 16, threading the outer sleeve into the fitting. Threads 30 connecting the sleeve have a lead in the same direction as threads 20 in the spindle, as do the external threads 23 in the sleeve 29, all being right-hand in this instance. Such turning of the outer sleeve 29 is continued until the nose 31 of the inner sleeve is jammed tightly against the shoulder 15 of the fitting. The nose of the tool, with the fitting in place thereon, is then thrust through the hole 14 and the spinner head 19 is screwed on the spindle, thus positioning the parts as indicated in Fig. 2 for commencement of the spinning operation.

To effect the spinning or flaring operation, the sleeve head 28a is gripped in a vise or otherwise held against rotation and the spindle 16 revolved in the direction of the arrow A by the handle 18. In the event that the tool is located adjacent a wall or bulkhead, the rod 35 may be permitted to swing against the wall and thus hold the sleeve 28 against turning. As the spindle 16 revolves it is fed axially by the lead of threads 20 in a direction to withdraw it through the supporting structure 21 so that the revolving spinner head 19 is pulled gradually into the end 13 of the fitting 10. In this way the end of the fitting is flared outward to the contour indicated in Fig. 3. Moreover, the throat portion of the end of the fitting within the hole 14 is expanded so that the marginal portion of the wall 11 about such hole tends to bite into the exterior of the fitting. Also the approaching opposed faces 22 and 31 of the spinner head and sleeve 28 squeeze the fitting between them. As a result, the fitting is secured to the wall 11 with extreme rigidity.

Upon completion of the spinning operation described, the supporting structure 21 will usually be found to be jammed very tightly within the fitting 10. To remove the tool the workman holds the outer sleeve 29a against turning, as, for example, by means of the handle 36, and backs off the inner sleeve 28, by turning it to the left, so that the pin 33 is swung from the notch end wall 34a to the other notch end wall 34b. This retracts the inner sleeve 28 axially of the sleeve 29 from the position of Fig. 3 to that of Fig. 4, thus relieving the jam. After that the spinner head 19 can be unscrewed and the outer sleeve 29a unscrewed from the fitting 10 to remove the tool without any difficulty or impediment.

To condition the tool for use in a fitting or the like of different diameter or having different pitch threads, it is necessary merely to replace the outer sleeve element 29 with one of appropriate size and threads. Should the end of the fitting which is to be flared be of different size it is equally simple to screw in place a replacement spinner head of appropriately different size.

We claim as our invention:

1. In a tool of the type described for flaring a reduced end portion of a tubular fitting or the like, the combination of a generally tubular supporting structure, a spindle passing through said supporting structure with one end projecting outward beyond the fore part of said structure, said spindle being threaded within said structure for axial withdrawal of said one end of the spindle toward the supporting structure as the spindle is revolved, and a spinner head of generally T shape on said one end of the spindle disposed with the arms of the T projecting laterally of the spindle and with the stem of the T pointing toward the spindle coaxially with the latter, the undersides of the T arms being sloped inward toward the stem to enter the reduced end of the fitting and flaring it progressively outward as the spindle is revolved to withdraw it into the supporting structure and through the fitting, and said spinner head being removably threaded on said spindle by threads having a lead opposite to that of the threads connecting the spindle to said supporting structure, whereby frictional drag of the work on the spinner head incident to its rotation by the spindle as the latter is revolved will tend to tighten the head on the spindle.

2. In a tool of the type described, the combination of a support, a spindle threaded therein, a spinner head threaded on one end of the spindle, the lead of the threads connecting the head to the spindle being opposite to that for the threads connecting the spindle to its support, whereby frictional drag of the work on the spinner head incident to its rotation by the spindle as the latter is revolved in said support will tend to tighten the head on the spindle, and said head and spindle having mating abutments thereon engageable to limit the turning of the head on the spindle in a direction to tighten the threaded connection therebetween and thus prevent the head from becoming screwed too tightly on to the spindle in the course of the operation of the head upon a work piece.

3. A tool of the general type described comprising, in combination, a supporting structure including two sleeve elements threaded one within the other, a spindle having a tool head thereon and threaded within the inner sleeve element for feed axially of the same as the spindle is revolved to turn the tool head, the outer sleeve element being externally threaded for securing the same within an internally threaded fitting or the like which is to be operated upon, and the inner one of said sleeve elements having a portion projecting axially beyond the outer element to abut against a shoulder or the like within the fitting.

4. In a tool of the type described for operating upon a reduced diameter end portion of a fitting or the like whose other or larger end portion is interiorly threaded, the combination of a supporting structure including a pair of sleeve elements threaded one within the other and arranged with both ends of the inner element projecting beyond the corresponding ends of the other element, said sleeve elements each having a corresponding wrench engageable head at one end thereof, the outer sleeve element being externally threaded for screwing the same into the fitting with the projecting end of the inner sleeve element abutted against the shoulder in the fitting separating its larger and smaller diameter portions, and a tool supporting spindle revolubly mounted within the inner sleeve element.

5. A tool of the general type described comprising, in combination, a supporting structure including two sleeve elements threaded one within the other, stop means for limiting relative rotation of the sleeve elements to less than a full revolution, a spindle having a tool head thereon and threaded within the inner sleeve element for feed axially of the same as the spindle is revolved to turn the tool head, the outer sleeve element being externally threaded for securing the same within an internally threaded fitting or the like which is to be operated upon, the external threads on said outer sleeve element and the threads between said sleeve elements both having a lead in the same direction, and the inner one of said sleeve elements having a portion projecting axially beyond the outer sleeve element to abut against a shoulder or the like within the fitting.

6. A tool of the general type described comprising, in combination, a supporting structure including two sleeve elements telescoped one over the other and movable axially of each other, one end of the inner sleeve element projecting beyond the corresponding end of the outer sleeve element, the outer sleeve element being dimensioned for insertion within a fitting or the like which is to be operated upon by the tool, and a tool supporting spindle revolubly mounted within the inner sleeve element.

ARTHUR I. APPLETON.
CARL H. STAHL.